United States Patent [19]
Krause et al.

[11] Patent Number: 5,975,538
[45] Date of Patent: Nov. 2, 1999

[54] RADIAL LIP SHAFT SEAL

[75] Inventors: Roger W. Krause, Hastings, Nebr.;
Scott C. Spencer, Vandalia, Ill.;
Donald C. Ulrich, Laconia, N.H.

[73] Assignee: John Crane Inc., Morton Grove, Ill.

[21] Appl. No.: 08/878,907

[22] Filed: Jun. 19, 1997
(Under 37 CFR 1.47)

[51] Int. Cl.⁶ .................................................. F16S 15/32
[52] U.S. Cl. .......................................... 277/551; 277/584
[58] Field of Search .................................. 277/351, 350, 277/353, 400, 551, 584

[56] References Cited

U.S. PATENT DOCUMENTS

| | | | |
|---|---|---|---|
| 3,306,223 | 2/1967 | Lieberg | 277/353 |
| 3,495,843 | 2/1970 | Andersen et al. | 277/584 |
| 4,283,064 | 8/1981 | Staab et al. . | |
| 4,300,778 | 11/1981 | Gagne | 277/584 X |
| 4,376,541 | 3/1983 | Walter et al. | 277/353 |
| 4,448,426 | 5/1984 | Jackowski et al. | 277/353 |
| 4,508,020 | 4/1985 | Szcupak | 277/353 |
| 5,056,799 | 10/1991 | Takenaka et al. . | |
| 5,186,472 | 2/1993 | Romero et al. | 277/351 |
| 5,201,529 | 4/1993 | Heinzen | 277/351 |
| 5,211,406 | 5/1993 | Katzensteiner | 277/351 |
| 5,370,404 | 12/1994 | Klein et al. . | |
| 5,503,408 | 4/1996 | Hemann et al. . | |

*Primary Examiner*—Lynne Reichard
*Assistant Examiner*—John R. Cottingham
*Attorney, Agent, or Firm*—Dorn, McEachran, Jambor & Keating

[57] ABSTRACT

A lip seal for use in low torque, high pressure applications including a rigid retainer, a resilient body essentially covering the retainer and an inner support member. The inner support member provides spacing and orienting functions for the other elements. The inner support member has a radial dimension and outer diameter smaller than the inner diameter of an outer axial wall of the retainer so that a gap is maintained between the retainer and the inner support member under a variety of pressure, torque and shaft deflection conditions. Gap maintaining elements, preferably in the form of axially extending guides, prevent contact between the rigid seal elements. The guides may further comprise nub portions at one end which contain the inner support member in the cavity prior to installation on the shaft.

12 Claims, 2 Drawing Sheets

RADIAL LIP SHAFT SEAL

BACKGROUND OF THE INVENTION

1. Field of the Invention

This invention relates generally to radial lip seals, and more particularly, to radial lip seals which can accommodate significant shaft deflection in an environment in which the shaft rotates at low speed, and under high torque conditions and in which the fluid being sealed attains high pressures.

2. Background Art

Lip seals are usually molded of a resilient elastomeric or polymeric material. They are secured in fluid tight relation to a housing and surround a rotating shaft which extends through an aperture in the housing wall. The sealing lip is in sealing relationship to the shaft to contain the fluid in the housing.

Lip seals components or elements include a rigid case or retainer to add rigidity and to unitize the seal assembly. The case also aids in the installation, withdrawal and retention of the seal relative to the housing. The resilient body includes a secondary seal to seal against the housing and one or more resilient sealing lips which are maintained in sealing contact with the shaft.

Lip seals experience a wide variety of uses in which operating temperature and pressure conditions, expected shaft speeds, and the make-up of the medium to be contained dictate the requirements of a particular construction. Typically, however, the rigid component or retainer is formed of hard plastic, such as phenolic, steel or stainless steel and the resilient lips are defined by elastomeric or polymeric members such as molded rubber, polytetrafluoroethylene or other known materials. The resilient element may be molded as a single body or may comprise a plurality of separate elements connected together in fluid tight relation.

The nature of lip seal applications expose the seal to conditions of significant shaft movement relative to the surrounding housing. Shaft deflection relative to either the housing or the bore results in a wobble of the shaft during rotation of the shaft, also referred to as shaft run-out. A significant degree of shaft run-out often challenges the effectiveness of the lip seal.

Specific applications for lip seals may include automotive, appliance and industrial applications. Certain applications subject lip seals to extreme service conditions such as in air conditioning compressors, where the shaft is typically driven by a belt and pulley through an electric clutch, and in oil pumps which generally pressurize oil to high pressures, to thereby permit effective circulation of the oil through the engine and oil filter. Compressor and oil pump design typically results in shaft wobble, bending distortion and misalignment of the shaft axis relative to the housing aperture. Ideally, the lip seal assembly takes into account the established tolerances of the devices in which the lip seal is used in order to minimize the associated manufacturing costs.

Efforts to provide a lip seal to accommodate shaft run-out or misalignment include use of extended conical shapes, multiple lips and other variations and alterations of the resilient element. An effective arrangement is disclosed in U.S. Pat. No. 5,503,408, issued Apr. 2, 1996, and commonly assigned with this invention to John Crane Inc., Morton Grove, Ill. The seal disclosed and claimed in U.S. Pat. No. 5,503,408 embodies multiple resilient lips which provide for an auxiliary or alignment lip interposed between the shaft and the sealing lip for centering the lip seal. Under conditions of misalignment, the auxiliary lip contacts the underside of the primary sealing lip and causes a displacement of that lip in the direction of displacement of the shaft relative to the center of its associated housing bore. Displacement of the auxiliary lip causes the primary sealing lip to "follow" the shaft and, thereby, maintain the integrity of its sealing relation to the shaft. The lip seal described in U.S. Pat. No. 5,503,408 is used in relatively low pressure type applications.

The misalignment problem is also addressed in commonly assigned copending U.S. patent application Ser. No. 08/606,421, filed on Feb. 23, 1996, entitled "Improved Radial Lip Seal" and having at least one common inventor with this invention. The features of that invention include a sleeve bearing member which defines an annular body having a "T-shaped" cross section. An outer cylindrical surface of the annular body is sized to coincide with the inner axial surface central of an axial wall of an associated retainer. A radial edge of the annular body is in contact with the inner surface of an axial wall of the retainer so as to secure the bearing member in the assembly and retain it against rotation and radial displacement. A radial inner portion of the bearing member defines a cylindrical sealing surface sized to be in close supporting contact with the outer surface of the shaft. When installed in a housing, the sealing elements of the seal assembly are disposed inboard of the bearing member, thereby maintaining the bearing outward of the sealed chamber in the environment external to the housing. The bearing disclosed in the patent, which is interposed between the lip seal and the fluid being sealed within the housing, also acts to maintain orientation and position of the lip seal.

The bearing member disclosed in aforementioned U.S. patent application Ser. No. 08/606,421 may be either rigidly or resiliently mounted on, and in contact with, the outer diameter surface of a supporting retainer to provide shaft vibration dampening. In the case of a resilient mounting, the bearing member includes a radial wall in frictional engagement with the resilient body supporting the bearing member to restrict rotation of the bearing member relative to the housing.

All of the prior efforts which provide lip seal centering by means of a bearing member work adequately in the low pressure environments for which they are intended. However, in the event that the fluid being sealed attains high pressures, the lip seal becomes subject to deformation from axially directed pressure forces, resulting from the high pressures acting on the radial area of the lip seal, which press the radial sealing lip against the bearing. At high pressures, the radial seal lip is further subject to folding over at the shaft, thereby resulting in a loss of sealing capacity.

To some extent, bearing members which are utilized in the efforts and examples described above maintain seal lip centering and also contain the seal lip in the desired orientation and position between the bearing and the high pressure fluid being sealed. However, bearings, by the nature of their construction and function, extend from the seal lip and provide rigid axial support to the retainer member relative to the shaft. In most instances, the outer diameter of the bearing is flush against the inner diameter of the rigid retainer member, so that any shaft deflection causes the bearing to impart that deflection to the retainer, thereby maintaining a predetermined relative orientation between the lip seal and the rotating shaft. Dampening action of a resilient mounting between the bearing and the retainer member absorbs the majority of the deflection. However, even in the resilient mounting example, the abutment of the bearing member with the resilient retainer subjects the bearing to continual repeated stress, which over extended periods of time can cause the deterioration and destruction of the bearing.

The present invention addresses the needs of the seals in some applications to accommodate a greater amount of pressure and inflexibility which results from the increased pressure sealed fluid environments. The ability of the improved lip seal according to the present invention to accommodate great pressures allows for the elimination of expensive case pressure drain systems that are presently required for high pressure applications.

SUMMARY OF THE INVENTION

The present invention is directed to a unitary lip seal assembly which includes a rigid retainer and a resilient member secured thereto with at least one generally radially directed lip for sealing engagement with an associated shaft. A relatively rigid sleeve inner support member is adapted to surround the shaft and is secured to the retainer preferably by loose engagement with the resilient member. The inner support member is positioned relative to the sealing lip so as to be outboard thereof. In its preferred form, the inner support member is secured directly to the retainer and the inner sleeve support member is positioned relative to the sealing lip such that the lip is adapted to contact the shaft intermediate the cylindrical bearing surface and the fluid in the interior of the housing. The inner support member defines a radial support surface for maintaining the radial sealing lip intermediate the radial support surface and the high pressure medium being sealed. The support member is shaped and dimensioned and has an outer diameter adapted to maintain a predetermined spatial separation between the retainer member outer diameter portion and the axially extending portion of the support member irrespective of the operational conditions, such as amount of shaft deflection, or of the pressure of the medium being sealed.

DESCRIPTION OF THE PREFERRED EMBODIMENTS

Figure 1:
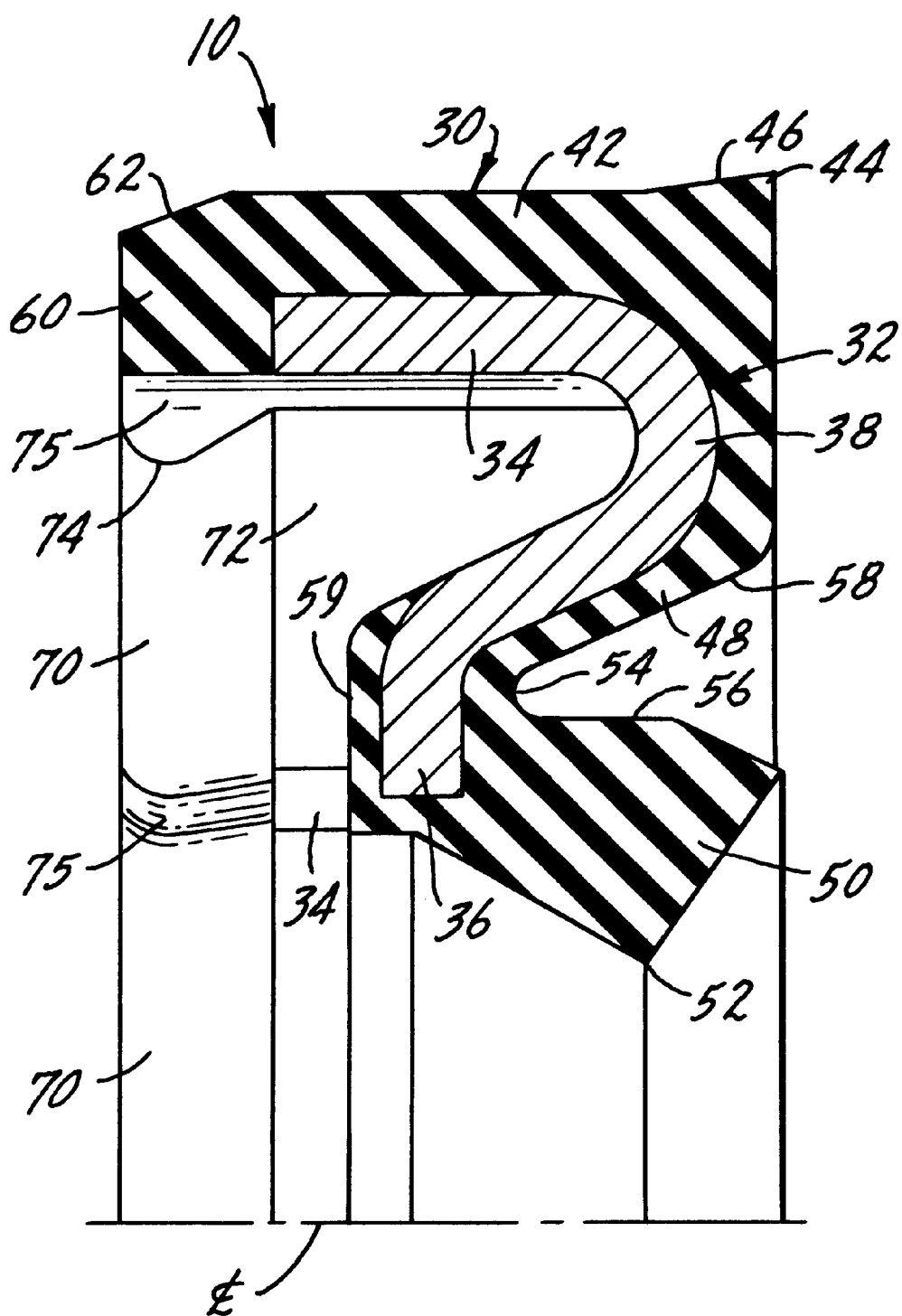
FIG. 1 is a sectional view of an uninstalled seal assembly according to the present invention.
Figure 2:
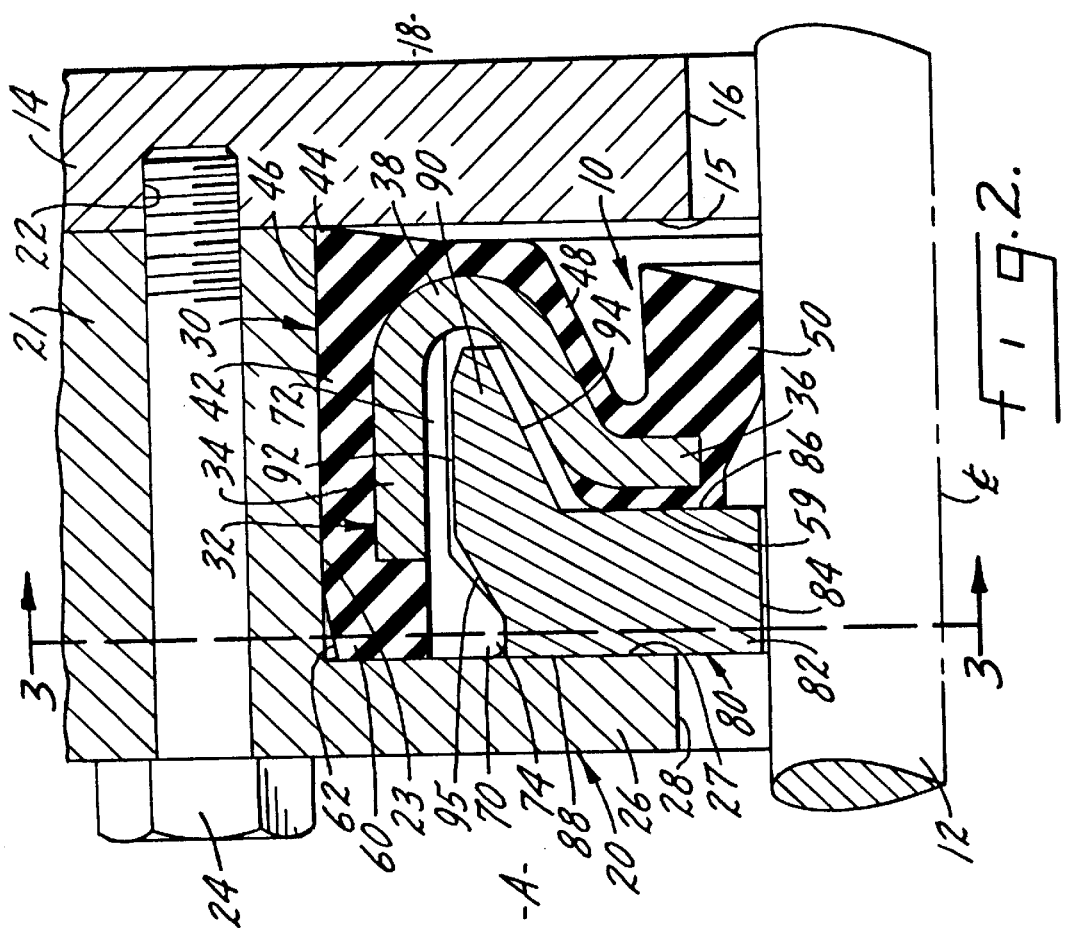
FIG. 2 is a partial view, in section, showing the seal assembly of the present invention installed in a housing.
Figure 3:
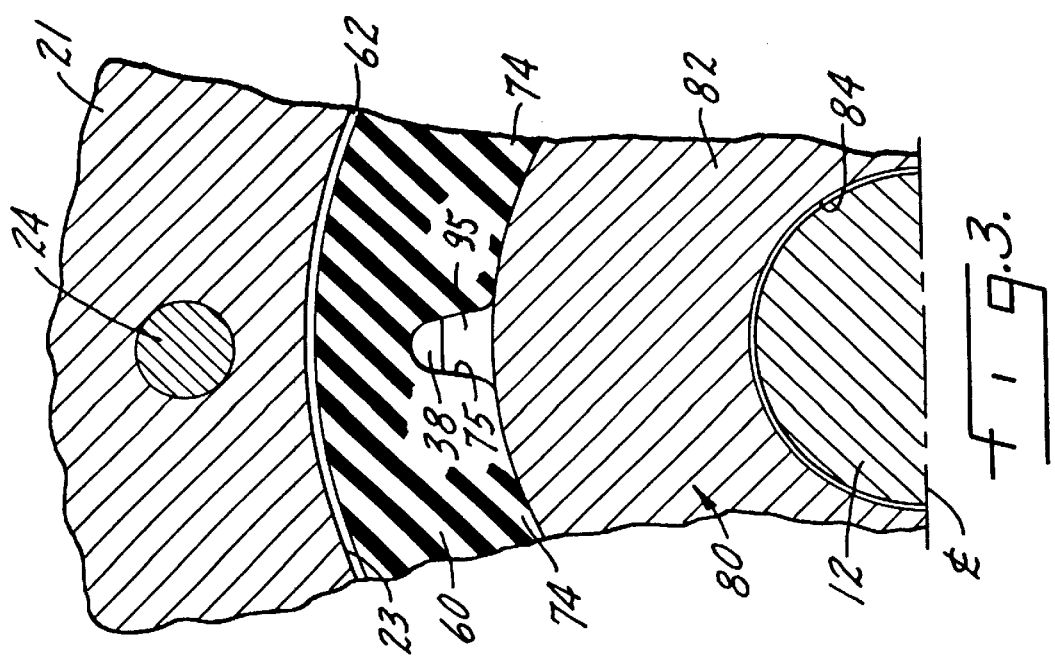
FIG. 3 is a cross-sectional view of the seal assembly shown in FIG. 2, the cross-section taken approximately along the line 3—3.

Referring to FIGS. 1 through 3, a lip seal assembly, generally designated 10, is illustrative of the principles of the present invention. The inventive lip seal assembly 10 comprises several components, and is shown in FIG. 1. The seal assembly illustrated in FIG. 1 is rendered in an assembled condition, but not installed. FIGS. 2 and 3 illustrate the seal assembly 10 installed in a hydraulic application, such as a motor or oil pump, and disposed about a shaft 12 which extends through an aperture in the pump housing 14. The invention is particularly well suited for low torque high pressure hydraulic applications.

The aperture is defined by a cylindrical wall 16 which surrounds shaft 12 in spaced relation. The pump housing 14 is shown in partial section in FIGS. 2 and 3, with the shaft 12 extending through the aperture. The lip seal assembly 10 seals the aperture to minimize leakage from the pump housing even when the oil is under great pressure which are generated by the rotor (not shown) which is attached to the shaft 12. It is understood by those having skill in the art that all of the seal members shown in FIGS. 1 and 2 are annular members which are disposed concentrically with the shaft 12. The elements are shown in the drawing figures in partial cross-sectional views for convenience. That is, those portions of the seal assembly 10, the shaft 12, and the housing 14 which extend below the centerline CL are not shown. These elements would be essentially identical to the portions above the centerline, and the convention is to illustrate only one-half of the members to allow illustration in greater detail.

Housing 14 defines internal chamber 18 which surrounds the shaft 12 and is filled with a lubricant, such as oil. When the shaft is rotating together with the attached rotor (not shown), pressure is generated within the chamber 18. Oil pump components, such as the rotor (not shown), are disposed inboard of the housing 14 and operate to generate pressure of the oil which is then pumped through the lubrication system of the hydraulic system or other application requiring a hydraulic pump or motor for low speed, high pressure applications.

Seal assembly 10 is annularly disposed axially outboard of the housing 14 and adjacent the aperture cylindrical wall surface 16. Seal assembly 10 maintains a seal at the aperture and produces a sealing relation between the surface of shaft 12 and the radial surface 15 of the housing 14. Seal assembly 10 separates chamber 18 from the environment, such as atmosphere, indicated as A in FIG. 2, which is external to the housing 14.

Seal assembly 10 is retained in place by a conventional end plate assembly as shown in FIG. 2. The end plate assembly comprises generally an annular end plate 20 and an end plate connection portion 21 which is removably attached to the housing 14 by means of an appropriate threaded bore 22 and a bolt 24. Only one bolt connection is shown in the partial cross-section of FIG. 2, but those skilled in the art will readily recognize that a plurality of such bolt connections are required in spaced annular relation about the end plate 20 to provide a uniform axial connection of the end plate assembly to the housing 14.

The annular end plate 20 may be integral with the connecting portion 21, or these may be separate members which together form the end plate assembly. An embodiment having separate members (not shown) would have corresponding bores in both members through which a bolt 24 extends connecting the members to each other and both members to the housing 14 of the radial outer wall 15. The connecting portion 21 as shown in FIGS. 2 and 3 includes a cylindrical inner diameter wall 23 which provides a sealing surface for the seal assembly 10, as will be explained below.

End plate 20 further comprises a flanged portion 26, which is preferably integral with the connection portion 21. The flanged portion 26 extends radially inwardly from the connecting portion 21 of the end plate 20 and is generally parallel to the radially-extending outer wall 15 of the housing 14. A cylindrical end plate wall 28 is spaced from the surface of the shaft 12. The separation between wall 28 and the surface of the shaft 12 has a magnitude within a predetermined range of dimensions, as will be explained below. The flanged portion 26 further comprises a radially extending inner wall 27 extending between the connecting portion 21 and the cylindrical inner diameter wall 28. The end plate 20, including the flanged portion 26, together with the radially extending outer wall 15 of the housing 14, define an annular space for receiving the seal assembly 10. The axial and radial dimensions of that annular space also have predetermined dimensions to permit securing the seal assembly 10 within the annular space as will be explained below.

The details of seal assembly 10, in an uninstalled condition, are illustrated in FIG. 1. Seal assembly 10 includes an annular resilient seal body 30 bonded to a rigid retainer 32. The resilient body 30 may comprise an elastomeric material, such as hard rubber, and the rigid retainer 32 may comprise a metallic material, e.g. steel. A sleeve inner support member, sometimes referred to as a containing support member, is intended for use in the completed and installed seal assembly 10, and is shown and described below with reference to FIGS. 2 and 3.

Retainer 32 is an annular, ring-like structure which includes an axially extending collar 34 at the outer diameter, a shortened radially extending flange 36 at the inner diameter to the radial flange 36. A curved connecting portion 38 extends radially inwardly from the collar 34 and connects collar 34 to the radial flange 36. In cross-section, the retainer 32 appears in the shape of a question mark, without the period, or as a truncated S. as is shown in FIGS. 1 and 2.

Resilient body 30 is an integral elastomeric or polymeric element, as shown, and is formed by a molding or injection process. Typically, the forming of the body 30 and its bonding to retainer 32 occur simultaneously during the molding process. Body 30 includes an annular ring portion 42 which is bonded to the outer diameter surface of the annular, axially extending retainer collar 34. Ring portion 42 includes a circumferential extension section 44 which is formed at a corner of the retainer 30 on an outer surface 46 thereof and may be flared at each end to provide a better interference fit in the installed condition.

Installation of seal as illustrated in FIGS. 2 and 3, causes extension section 44 to sealingly engage the annular cylindrical wall 23 of the end plate connecting portion 21. In order to ensure a fluid tight seal between the outer diameter wall of the body 30 and the inner diameter cylindrical wall 23 of the connection portion 21, the outer diameter of extension section 44 is formed to be slightly larger than the inner diameter of cylindrical wall 23. A limited amount of compression of the flared extension section 44 and of ring portion 42 occurs upon installation, which aids in creating a fluid tight seal.

Referring again to FIG. 1, a shallow layer of the elastomeric material which defines a central covering portion 48 extends radially inwardly from ring portion 42 and is disposed on the outer curved section of the retainer connecting portion 38. Preferably, the central covering portion 48 is molded onto connecting portion 38 so that the elastomeric material encloses and isolates the metallic retainer 32 from the process fluid contained under pressure within the chamber 18. This aids in avoiding corrosion of the metallic retainer 32.

Extending radially inwardly from the central covering portion 48 is a sealing lip 50. The sealing lip 50 is integral with the central covering portion 48 and is molded onto the short radially extending flange 36 of the retainer 32. It comprises a main body and a contacting point 52 for sealing contact with the surface of shaft 12. In the uninstalled condition, the lip 50 extends at an angle in a radially inward direction relative to the center line CL and axially away from the body of the seal assembly 10 toward the direction where the pressurized hydraulic fluid would be disposed.

Extending radially outwardly from the lip 50, and on the opposite side of the flange 36 from the lip 50, is an elastomeric flange end covering portion 59. The flange end covering portion 59 is integral with the sealing lip 50, so that the elastomeric material of the body 30 essentially covers and sealingly protects the outer surface of the retainer 32 form the oil or other fluid being sealed.

Extending axially and radially from the resilient body 32 is a projection portion 60 which extends axially of the end of the collar portion 341 of the retainer 32 for a predetermined distance. The projection portion 60 acts to maintain the desired axial spacing of the seal assembly in relation to the radially extending walls 27, 15 of the end plate 26 and housing 14, respectively. Projection portion 60 may include a chamfer 62, as shown, to permit easier installation of the seal assembly 10 within the end plate 22.

Also extending axially from the projection portion 60 on the opposite side of the axial wall of collar 34 from the annular ring portion 42 are a plurality of snap segments 70 which are annularly spaced around the inner circumference of the retainer axial wall 32. Each snap segment 70 comprises a generally circumferential and axially extending guide portion 72 utilized for spacing, and a semi-circular, circumferentially extending nub portion 74, for retaining the other elements of the lip seal assembly in place. Both the guide portions 72 and the nub portions 74 extend generally circumferentially around the inner diameter of the retainer axial wall 34. When considered all together, the snap segments 70 essentially cover the inner diameter surface of the axial wall of collar 34 and the nub portions 74 from a lip which contains the cavity defined by the retainer 32 and seal body 30.

Snap segments 70 comprise a plurality of adjoining segments that are separated from each other by axially extending chaplets 75. Chaplets 75 form shallow grooves cut into the resilient material of the snap segments 70. The chaplets extend to the inner diameter wall of the collar 34, and extend axially from the retainer connecting portion 38 to the axially opposite end of the projection portion 60.

The chaplets 75 provide two functions. First, during forming or molding of the resilient body 30, the chaplets provide a means by which the form or mold accurately positions and orients the retainer 32. The inner diameter surfaces of the retainer axial wall 34 immediately adjacent the chaplets 75 are the only portions of retainer 32 which remain exposed following the molding of the resilient body 30 over the retainer 32. Another function served by the chaplets 75 is as a space into which the resilient material comprising the snap segments 70 may extrude into when the snap segments are under compression. Since elastomers such as rubber, are resilient, but not compressible, a space must be provided to accept excess material, and thereby permitting resilient engagement between the outer diameter surface 92 and the inner diameter surface of the axial wall of collar 34.

The snap segments 70 also may comprise elastomeric or polymeric material and preferably are integral with the resilient seal body 30, as shown in most clearly in FIG. 3. The snap elements 70 serve to position, orient and contain the sleeve containing or inner support member, as will be explained below relative to FIGS. 2 and 3. A plurality of snap elements 70 are preferred to provide good centering capability to the inner support member 80, even when the shaft 12 is undergoing substantial radial deflection and during operation when the seal assembly 10 is undergoing great amounts of fluid pressure. The optimal number of snap segments 70 are six, with six corresponding chaplets 75, one chaplet each separating adjacent snap segments 70.

Body portion 30 is disposed between the walls 27, 15 defining the space accepting the seal assembly 10. The outer diameter annular ring portion 42 seals against the connecting portion wall 23 and the lip 50 seals against the rotating shaft 12. The central covering portion 48 is located at the inboard axial end of seal assembly 10, which is the end facing toward internal chamber 18 of housing 14. The opposite, or outboard axial end of seal, including the flange end covering portion 59 of assembly 10, is exposed to the environment, indicated at A.

Resilient seal body 30 is molded onto and bonded to retainer 32. The body 30 and retainer 32 together define a radially fixed mounting for the lip 50 which is able to angularly shift its position to accommodate shaft deflection while at all times maintaining a. seal against the surface of the shaft 12. In the installed position of seal assembly 10 (FIGS. 2 and 3), the contacting point 52, which extends circumferentially around the shaft 12, contacts the surface of shaft 12. Similarly, the flared extension section 44 of the ring portion 42 contacts the wall 23 and possibly the radial wall 15 of housing 14 to provide a fluid tight seal against the housing 14.

An annular undercut or recess 54 is formed in the resilient body 30 which permits flexing or bending of the lip 50 as the shaft runout causes radial movement or shaft deflection upon rotation. The walls 56, 58 forming the undercut are positioned, dimensioned and oriented to cause the lip 50 to pivot about an annular circumference which is approximately disposed about the shortened flange 36.

In an uninstalled condition, the lip 50 may be larger than the lateral width of the undercut, as shown in FIG. 1, but when the seal assembly 10 is installed and the pump pressurizes the liquid being sealed, the lateral width of the undercut 54 may become larger, as shown in FIG. 2 due to the pressure of the sealed liquid acting on surfaces 56, 58. Nevertheless, the axial width of the lip at the connection to the remainder of the body 30 is of a dimension to permit extensive flexing of the lip 50 relative to the body 30 without causing tearing or otherwise affecting the integrity of the material or the seal provided by the lip seal assembly 10. The shape of the retainer 32 and its disposition fairly close to the shaft 12 provides a rigid base so that together with the inner support member 80, described below, the seal lip will provide an effective seal without failure for long periods of time.

Referring now to FIGS. 2 and 3, the lip seal assembly 10 is shown in an installed position. The inner support member 80 is disposed within the annular space defined by retainer 32 and the radially extending inner wall 27 for loose engagement therewith. Inner support member 80 comprises an annular ring made of a rigid material. The body of the inner support member 80 comprises a ring portion 82 having an inner diameter surface 84, a radial inboard wall 86, a radial outboard wall 88, and a cantilevered projection portion 90 having an outer diameter surface 92 and an inner diameter angled surface 94. The cantilevered portion 90 is sized and dimensioned to fit loosely within the narrow conical space defined by the curved connecting portion 38 and the axially extending collar 34 of the retainer 32.

The configuration of these two elements 32, 90 and of the general engagement and tolerances of these elements is an important feature of the present invention, as will be explained below. As shown, the surfaces 92, 94 do not come into contact with the surface of the retainer 32 under normal operating conditions. However, under appropriate tolerance control of the elastomeric members 72, and 59, the gaps between surface 92 and the axially extending collar 34 and between the inboard wall surface 86, the angled surface 94 and the radially extending flange 36 are always maintained at a minimum value irrespective of the fluid pressures which are developed within the chamber 18.

An additional feature of the present invention is that the inner support member 80 has an inner diameter surface 84 which is slightly larger than the diameter of shaft 12. The clearance between the cylindrical inner surface 84 and the shaft 12 should have a predetermined dimension so that any radial deflection of the shaft 12 due to shaft deflection or runout causes a similar deflection of lie proportion in the inner support member 80. The general result is that the inner support member 80 rides on the surface of the shaft 12, but does not rotate therewith, and shaft run out causes some radial deflection of the inner support member 80.

The clearance between cylindrical inner surface 84 and the outer diameter of the shaft 12 must be minimized so that the two elements avoid frictional contact. A minimal gap will tend to restrict excessive axial displacement or inversion of the lip 50. As is recognized by those of ordinary skill in the art, generation of excessive fluid pressure in chamber 18 (FIG. 2) can cause a sealing lip, such as seal lip 50, to invert. Inversion of a seal lip removes the benefit of the fluid pressure acting on the seal lip to provide a radially inwardly directed force, and can cause loss of sealing effectiveness. For this reason, the radially extending inboard wall 86 of the inner support member 80 extends as close as possible to the surface of shaft 12, at cylindrical wall 84. The support member 80 acts as a physical barrier to the lip seal 50 preventing excessive axial displacement or inversion thereof.

Other sealing elements of seal assembly 10 assist in the snap fit of the inner support member 80 within the cavity defined by the retainer 32 and the flanged portion 26 of the end plate 20. For example, the guide portions 72 provide a centering function and provide for the proper spacing between the inner support member outer diameter 92 and the inner diameter surface of the axially extending collar portion 34. The nub portions 74, being somewhat larger than the guide portions 72, are sized to fit within the recess 94 formed in the outer diameter 92 of the inner support member 80.

The tolerances of the relative dimensions between certain seal elements are all of extreme importance both for maintaining the ability of the seal assembly 10 to seal and for maintaining a space between the outer diameter of the inner support member 80 relative to the inner diameter of the axially extending collar portion 34. The distance between the radial wall 27 and the elastomeric flange and covering portion 59 relative to the axial length of the inner support member inner diameter ring portion 42 is important. Also, the radial dimension between the shaft and the retainer collar portion 34 relative to the radial dimension between the inner diameter cylindrical surface 84 and the outer diameter 92 of the inner support member 80 must all be within a predetermined range. Close attention to the tolerances of these elements is important to avoid contact between rigid elements, such as between retainer 32 and the inner support member 80, even when undergoing extreme operational conditions in the specific application in which the lip seal 10 is used.

The clearance between cylindrical outer diameter surface 92 and the inner diameter surface of the axially extending retainer wall 34 must be such as to permit intermittent or cyclical radial motion of the inner support member 80 upon deflection or radial displacement of the shaft 12 without causing contact to occur between the two surfaces. It has been found that avoiding such contact results in a much greater life cycle of the inner support member 80 because of the elimination of radial or side loading. Nevertheless, the inner support member 80 is retained in place and is constrained from axial displacement, by its surrounding framework of elements which define its location.

Another important feature shown in the lip seal 10 (FIG. 2) is the axial extension of the cantilevered portion 90 into the bight formed by the curved connecting portion 38 and the annular collar 34. Ideally, the gap between the outer diameter surface 92 and the inner diameter of the collar 34 and the gap between the connecting portion 58 and the inner diameter angled surface 94 are predetermined so that considerable variations in the angle of the shaft 12 relative to the cylindrical wall 16 and also in the fluid pressures acting on the seal do not cause contact between the surfaces. It has been found that close attention to the tolerances, such as the width and placement of the guide portions 72, and of the depth of the flange end covering portion 59, result in the ability of the lip seal assembly 10 to accommodate a great deal of shaft deflection by utilizing the high pressures developed during operation of the pump or other device to maintain contact between the lip 50 and the surface of shaft 12. High fluid pressure developed during operation acts within the bight or internal cavity, defined by the central curving position 48 and the sealing lip 50. The forces developed by this pressure act to deflect the conical surface of connecting portion 38 radially outwardly, and act on the lip 50 radially inwardly, which in turn tends to maintain a constant load of the lip 50 upon the surface of the shaft 12.

Still another feature provided by this invention is that the retainer maintains its shape, as shown in FIGS. 1 and 2, regardless of whether the lip seal assembly 10 is installed within a housing. This permits the inner support member 80 to float within the loose framework defined by the radial surface 27, the shaft 12, the guides 72 and the flange end covering portion 59. Floating within this framework, the inner support member 80 nevertheless maintains a minimal gap between the inner support cylindrical wall 84 and the shaft 12, as described above. These features result in the advantage that the radial loading on inner support member 80 is subjected to minimal radial or side loads across a great range of fluid pressures and shaft concentricity conditions. This feature greatly prolongs the useful life of the lip seal 10.

A wide variety of materials are suitable for use in the lip seal inner support member 80, including thermoplastics, ceramics, such as nylon or composite materials, cast iron, powder metal composites, bronze filled polytetrafluroethylene (PTFE). It is important that the material selected be sufficiently rigid to resist compression under the deflection action of the shaft which results from eccentric or misaligned running relative to bore surface 84. It should also comprise a material that is sufficiently self lubricating to permit extended running against the shaft in a dry condition so as to minimize friction. Also, when ambient operating conditions dictate, such as in the engine compartment of a vehicle where operating temperatures may exceed 300° F., materials such as filled thermoplastics are preferred. Filled and reinforced thermoplastics are considered particularly suitable because of their rigidity and selflubricating qualities.

Other modifications may become apparent to a person of ordinary skill in the art upon achieving an understanding of the inventive concept described herein. Accordingly, this invention is not limited by the illustrated embodiments shown and described herein, but is limited only by the following claims.

What is claimed is:

1. A unitary radial lip seal assembly for disposition in sealing relation between a bore in a housing wall and a rotatable shaft extending through the bore to contain high pressure fluid within the interior of the housing, said seal assembly comprising:

a) a rigid annular retainer member having an outer diameter axially extending portion and an inner diameter circumferential portion;

b) a resilient annular body secured to said retainer member, said resilient annular body defining at least one sealing lip adapted for sealing engagement with the shaft and an axially extending outer diameter body portion adapted for sealing against the housing, said axially extending outer diameter body portion being disposed adjacent said outer diameter axially extending portion of said retainer member;

c) a rigid inner support member generally disposed axially of said retainer member, said inner support member defining a radial support surface for maintaining said sealing lip intermediate said radial support surface and a high pressure medium contained by said housing wall, said support member being shaped and dimensioned and having an outer diameter disposed adjacent said retainer member outer diameter axially extending portion and being adapted to maintain a predetermined spatial separation between said retainer member outer diameter and an inner surface of said axially extending portion of said support member.

2. A unitary radial lip seal assembly as claimed in claim 1 wherein said resilient body is shaped and dimensioned to provide a cavity for receiving at least a portion of the inner support member and to provide a close tolerance fit of the support member within the resilient body.

3. A unitary radial lip seal assembly for disposition in sealing relation between a bore in a housing wall and a rotatable shaft extending through the bore to contain high pressure fluid within the interior of the housing, said seal assembly comprising:

a) a rigid annular retainer member having an outer diameter axially extending portion and an inner diameter circumferential portion;

b) a resilient annular body secured to said retainer member, said resilient annular body defining at least one sealing lip adapted for sealing engagement with the shaft and an axially extending outer diameter body portion adapted for sealing against the housing, said axially extending outer diameter body portion being disposed adjacent said outer diameter axially extending portion of said retainer member;

c) an inner support member generally disposed axially of said retainer member said inner support member defining a radial support surface for maintaining said sealing lip intermediate said radial support surface and a high pressure medium contained by said housing, wall, said support member being shaped and dimensioned and having an outer diameter adapted to maintain a predetermined spatial separation between said retainer member outer diameter portion and an inner surface of said axially extending portion of said support member, wherein said resilient body is shaped and dimensioned to provide a cavity for insertion of at least a portion of the inner support member and to provide a close tolerance fit of the support member within the resilient body;

wherein said assembly further includes a plurality of snap segments disposed annularly around said inner diameter circumferential surface of said outer diameter axially extending body portion, at least a first portion of said snap segments spacing the outer diameter surface from said inner diameter surface of said outer diameter axially extending body portion and at least a second portion of said snap segment retaining said support member within said cavity.

4. A unitary radial lip seal assembly as claimed in claim 3 wherein said second portion of said snap segment retaining said support member within said cavity further comprises a semi-circular nub extending radially inwardly from said outer diameter axially extending body portion, one of said nubs extending radially inwardly from an axial end of each said first portion of said snap segment.

5. A unitary radial lip seal assembly as claimed in claim 4 wherein said plurality of snap segments including said nubs are integral with said annular resilient body.

6. A unitary radial lip seal assembly as claimed in claim 5 wherein said plurality of snap segments and said nubs are separated by axially disposed chaplets, said axially disposed chaplets having a radial outermost dimension that is larger than the inner diameter radial dimension of said snap segments and of said nubs.

7. A unitary radial lip seal assembly as claimed in claim 6 wherein said plural snap segments comprise six segments, any two adjacent segments being separated by one of said chaplets.

8. A unitary radial lip seal assembly as claimed in claim 4 wherein said plurality of snap segments and said nubs are separated by axially disposed chaplets, said axially disposed chaplets having a radial outermost dimension that is larger than the inner diameter radial dimension of said snap segments and of said nubs.

9. A unitary radial lip seal assembly as claimed in claim 3 wherein said plurality of snap segments are separated by axially disposed chaplets, said axially disposed chaplets having an outermost radial dimension that is larger than the inner diameter radial dimension of said snap segments.

10. The unitary radial lip seal according to claim 1 wherein the rigid inner support member comprises at least one rigid material selected from the group consisting of thermoplastics, ceramics, nylon, composite materials, cast iron, powder metal composites, bronze filled polytetrafluoroethylene (PTFE).

11. The unitary radial lip seal according to claim 3 wherein the rigid inner support member comprises at least one rigid material selected from the group consisting of thermoplastics, ceramics, nylon, composite materials, cast iron, powder metal composites and bronze filled polytetrafluroethylene (PTFE).

12. The unitary radial lip seal according to claim 7 wherein the rigid inner support member comprises at least one rigid material selected from the group consisting of thermoplastics, ceramics, nylon, composite materials, cast iron, powder metal composites and bronze filled polytetrafluroethylene (PTFE).

* * * * *